United States Patent
Solan et al.

(10) Patent No.: US 10,686,174 B2
(45) Date of Patent: Jun. 16, 2020

(54) METHOD FOR MANUFACTURING A SEPARATING MEMBRANE FOR AN ACCUMULATOR

(71) Applicant: COMMISSARIAT A L'ENERGIE ATOMIQUE ET AUX ENERGIES ALTERNATIVES, Paris (FR)

(72) Inventors: Sebastien Solan, Seyssinet-Pariset (FR); Camille Guerin, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 77 days.

(21) Appl. No.: 15/812,444

(22) Filed: Nov. 14, 2017

(65) Prior Publication Data
US 2018/0138481 A1 May 17, 2018

(30) Foreign Application Priority Data

Nov. 15, 2016 (FR) ..................................... 16 61024

(51) Int. Cl.
*H01M 2/14* (2006.01)
*H01M 2/16* (2006.01)
(Continued)

(52) U.S. Cl.
CPC ........... *H01M 2/145* (2013.01); *H01M 2/166* (2013.01); *H01M 10/054* (2013.01);
(Continued)

(58) Field of Classification Search
CPC .... H01M 2/145; H01M 2/166; H01M 10/054; H01M 10/0565; H01M 2300/0085
(Continued)

(56) References Cited

U.S. PATENT DOCUMENTS

| 8,415,058 B2 | 4/2013 | Sakata et al. |
| 8,673,505 B2 | 3/2014 | Ohzuku et al. |
(Continued)

FOREIGN PATENT DOCUMENTS

| CA | 2 435 218 A1 | 1/2005 |
| EP | 2 618 409 A1 | 7/2013 |
(Continued)

OTHER PUBLICATIONS

Poly (methyl methacrylate). Wikipedia. Last edited Oct. 15, 2019. Retrieved on Oct. 30, 2019 from <URL: https://en.wikipedia.org/wiki/Poly(nnethyl_methacrylate)> (Year: 2019).*

(Continued)

*Primary Examiner* — Basia A Ridley
*Assistant Examiner* — James M Erwin
(74) *Attorney, Agent, or Firm* — Oblon, McClelland, Maier & Neustadt, L.L.P.

(57) ABSTRACT

The invention relates to a method of manufacturing a separating membrane in gel form, for an alkali metal ion battery, the method consisting of extruding a mix comprising:

- an alkali metal salt,
- a dinitrile compound with formula $N{\equiv}C{-}R{-}C{\equiv}N$, in which R is a hydrocarbon group $C_nH_{2n}$, and n is equal to 1 or 2 and preferably equal to 2,
- a hot melt support polymer, soluble in the dinitrile compound.

11 Claims, 2 Drawing Sheets

(51) Int. Cl.
*H01M 10/0565* (2010.01)
*H01M 10/0525* (2010.01)
*H01M 10/054* (2010.01)

(52) U.S. Cl.
CPC ... *H01M 10/0525* (2013.01); *H01M 10/0565* (2013.01); *H01M 2300/0085* (2013.01)

(58) Field of Classification Search
USPC ........................................................ 429/251
See application file for complete search history.

(56) References Cited

U.S. PATENT DOCUMENTS

| | | | |
|---|---|---|---|
| 8,691,446 B2 | 4/2014 | Sakata et al. | |
| 8,795,884 B2 | 8/2014 | Sakata et al. | |
| 2002/0061449 A1* | 5/2002 | Maruo | H01B 1/122 429/303 |
| 2011/0052980 A1* | 3/2011 | Sakata | H01M 4/131 429/199 |
| 2016/0013461 A1* | 1/2016 | Mizuno | C08J 5/18 429/143 |

FOREIGN PATENT DOCUMENTS

| | | |
|---|---|---|
| FR | 2 841 045 A1 | 12/2003 |
| JP | 07-176322 A | 7/1995 |
| WO | WO 97/44847 A1 | 11/1997 |
| WO | WO 2007/012174 A1 | 2/2007 |
| WO | WO 2007/117042 A1 | 10/2007 |
| WO | WO 2008/026782 A1 | 3/2008 |
| WO | WO 2008/138110 A1 | 11/2008 |

OTHER PUBLICATIONS

French Preliminary Search Report dated Mar. 10, 2017 in French Application 16 61024 filed on Nov. 15, 2016 (with French English Translation of Cited Documents).

Myung-Hyun Ryou et al., "Cross-linkable Polymer Matrix for Enhanced Thermal Stability of Succinonitrile-based Polymer Electrolyte in Lithium Rechargeable Batteries", Journal of Electrochemical Science and Technology, vol. 2, No. 4, 2011, pp. 6.

Li-Zhen Fan et al., "Succinonitrile as a Versatile Additive for Polymer Electrolytes", Advanced Functional Materials, 17, 2007, pp. 8.

Li-Zhen Fan et al., "All-solid-state polymer electrolyte with plastic crystal materials for rechargeable lithium-ion battery", Journal of Power sources, 189, 2009, pp. 4.

Nadine Voigt et al., "The effect of plastic-crystalline succinonitrile on the electrolyte system PEO: $LiBF_4$ Insights from solid state NMR", Solid State Ionics, 260, 2014, pp. 11.

Li-Zhen Fan et al., "Composite effects in poly( ethylene oxide)-succinonitrile based all-solid electrolytes", Electrochemistry Communications, 8, 2006, pp. 4.

Yan-Hua Li et al., "A novel polymer electrolyte with improved high-temperature-tolerance up to 170° C. for high-temperature lithium-ion batteries", Journal of Power Sources, 244, 2013, pp. 6.

Katharina M. Freitag et al., "Enhancement of Li Ion Conductivity by Electrospun polymer Fibers and Direct Fabrication of Solvent-Free Separator Membranes for Li Ion Batteries", Inorganic Chemistry, 56, 2017, pp. 8.

Office Action dated Aug. 22, 2019, in co-pending U.S. Appl. No. 15/812,214.

* cited by examiner

METHOD FOR MANUFACTURING A SEPARATING MEMBRANE FOR AN ACCUMULATOR

TECHNICAL DOMAIN

This invention relates to a method of manufacturing a separating membrane for an accumulator. More particularly, this invention relates to a method of making a flexible or even deformable separating membrane in gel form for an accumulator.

PRIOR ART

A lithium ion battery, illustrated in FIG. 1 and known in the state of the art, generally comprises:
- one or several electrochemical cores 1, each electrochemical core comprising an electrolytic constituent 2 inserted between a negative electrode 3 and a positive electrode 4, said positive electrode comprising an insertion material, for example the lithium cation,
- two current collectors 5 and 6, of the positive electrode and the negative electrode respectively,
- a solid or flexible packaging inside which the electrochemical core is located and that is hermetically sealed so as to make the device leak tight.

Current return tabs connected to the two collectors exit from packaging.

The positive electrode generally comprises a lithium cation insertion material. For example, this insertion material may comprise composite materials, for example of the $LiFePO_4$ type (lithium ion phosphate), or a transition metal oxide (lamellar materials: $LiCoO_2$: lithium cobalt oxide, $LiNi_{0.33}Mn_{0.33}Co_{0.33}O_2$, etc. . . . ).

The electrolytic constituent comprises a separator, physically separating the positive and negative electrodes. The separator may include a polymer material or a microporous composite, and is usually soaked with an organic electrolytic solution capable of transporting lithium ions from one electrode to the other. More specifically, lithium ions are transported from the positive electrode to the negative electrode during a charge cycle, and in the opposite direction during a discharge cycle.

The organic electrolytic solution, usually free of traces of water and/or oxygen, may include a mix of organic solvents (for example carbonates) to which a lithium salt is added, for example $LiPF_6$.

The negative electrode may be made of carbon graphite, silicon, or when power applications are envisaged, $Li_4Ti_5O_{12}$ (titanate material).

The current collector of the positive electrode is usually made of aluminium. Furthermore, the positive electrode may be formed by a technique for deposition of the insertion material on the current collector. The deposition technique may be an induction, silk screen printing or ink jet technique, or even spraying of a liquid.

The current collector of the negative electrode may be made of copper or aluminium depending on whether the negative electrode is made of carbon graphite or a titanate material, respectively.

Thus, the assembly of a lithium ion battery known in the state of the art usually comprises a first step to place the electrolytic core(s), without the electrolytic solution in the packaging.

Assembly of the lithium battery also includes a second step of introducing the electrolytic solution for wetting the electrolytic core(s), and more particularly soak the separator of the electrolytic core(s).

Finally, the packaging is sealed, for example heat sealed, to make the assembly leak tight.

Obviously, the electrical connection tabs must be positioned before the packaging is sealed.

However, this method of manufacturing a lithium ion battery is not satisfactory.

The known method of assembly according to prior art requires the use of a liquid electrolytic solution introduced into the packaging, in a manner such that the separator will be satisfactorily impregnated.

It is also desirable to be able to eliminate this step, in order to simplify the method.

Furthermore, lithium ions batteries assembled using the assembly method known from prior art are not very flexible, correspondingly limiting the shape of said batteries (for example by rolling).

Furthermore, the assembly method known in prior art is limited to the implementation of a plane separator. However, other separator shapes may be required for some applications, and particularly for textile applications.

Thus, one purpose of this invention is to disclose a method of manufacturing a separating membrane for an accumulator that simplifies the method of assembling said accumulator.

Another purpose of this invention is to also disclose a method of manufacturing a flexible and even deformable membrane.

Another purpose of this invention is to disclose a method of manufacturing a membrane such that said membrane may be in shapes other than a place surface.

Presentation of the Invention

The purposes of this invention are at least partly achieved by a method of manufacturing a separating membrane in gel form, for an alkali metal ion battery, the method comprises a step of extruding a mix comprising:
- an alkali metal salt,
- a dinitrile compound with formula N≡C—R—C≡N, in which R is a hydrocarbon group $C_nH_{2n}$, with n being equal to 1 or 2,
- a hot melt polymer support, with a glass transition temperature Tg, soluble in the dinitrile compound.

The method according to the invention thus being usable to make a separating membrane in gel form comprising the electrolyte.

The separating membrane thus manufactured has good mechanical strength and ionic conductivity necessary for use in an alkali metal ion battery. The extrusion method also opens up the way to fabrication of different shapes of membranes, for example wires and hollow tubes, particularly for applications in the textile and medical fields.

Use of the method of gelling the support polymer by the dinitrile compound gives the separating membrane sufficient mechanical strength to be used in an alkali metal ion battery, and an increased flexibility compared to solid membranes known from the state of the art.

Besides, the method according to the invention uses a single solvent, the dinitrile compound, to solubilise the alkali metal salt and to confer a gel form. In other words, there is no need to use a specific solvent for the support polymer. Consequently, no solvent evaporation step is required for the implementation of the method.

Moreover, the method according to the invention is simpler to implement than methods known from the state of the art.

According to one embodiment, the alkali metal salt is heat-solubilised in the dinitrile compound to form an electrolyte.

The term heat-solubilised means solubilised at a temperature higher than the melting temperature of the dinitrile compound.

According to one embodiment, extrusion is made by means of an extruder comprising at least one heating zone, at least one mixing zone and a pumping zone terminated by a die.

According to one embodiment, the support polymer is added into the extruder at the heating zone, where it is heated to a temperature T higher than its glass transition temperature Tg, advantageously to a temperature T between Tg and Tg+50° C.

According to one embodiment, the alkali metal salt and the dinitrile compound are introduced into the extruder either in the heating zone, or in the mixing zone.

According to one embodiment, the alkali metal salt is a lithium metal salt, the lithium metal salt advantageously comprises at least one element chosen from among: lithium bis-trifluoromethanesulfonimide, lithium bis(oxatlato)borate, $LiPF_6$, $LiClO_4$, $LiBF_4$, $LiAsF_6$, $LiCF_3SO_3$, $LiN(CF_3SO_2)_3$, $LiN(C_2F_5SO_2)$.

According to one embodiment, the support polymer comprises at least one element chosen from among: polyvinylidene hexafluoropropylene copolyfluoride, poly(methyl methacrylate), poly(butyl methacrylate), polyethylene oxide, polyvinylpyrrolidone.

According to one embodiment, the mass ratio between the dinitrile compound and the support polymer is between 40/60 and 90/10.

According to one embodiment, the concentration of the alkali metal salt in the dinitrile compound is between 0.5 mol/L and 5 mol/L.

BRIEF DESCRIPTION OF THE DRAWINGS

Other characteristics and advantages will become clear in the following description of the method of manufacturing a separating membrane in gel form for an alkali-metal ion battery according to the invention, given as non-limitative examples, with reference to the appended drawings in which:

FIG. 1 represents the stack of component elements of the electrolytic core of said battery.

DETAILED PRESENTATION OF PARTICULAR EMBODIMENTS

In each of the different embodiments, the same references will be used for identical elements or elements performing the same function, in order to simplify the description.

The invention described in detail below implements a method of forming a separating membrane in gel form, of an alkali metal ion battery, using a melting method. More particularly, the melting method according to the invention involves an extrusion step. The method according to the invention, that can be used to make flexible membranes in gel form, only uses three elements, namely a support polymer, a dinitrile compound, and an alkali metal salt.

Figure 1:
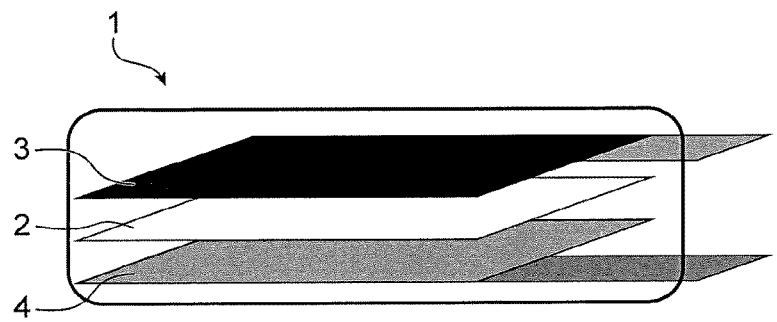
FIG. 1 is a diagrammatic view of a lithium ion battery, more particularly
Figure 2A:
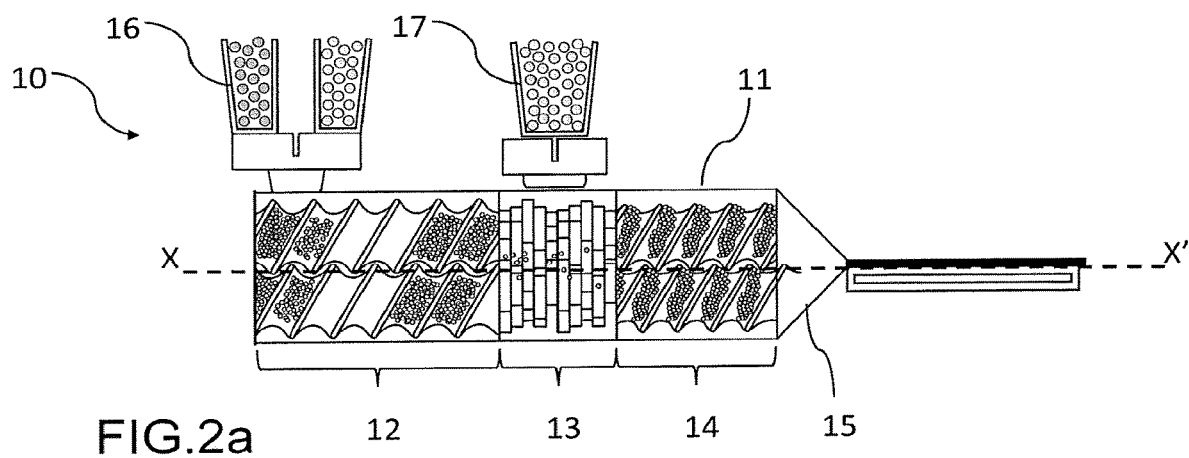
FIG. 2a is a diagrammatic according to a section plane of an extruder, the section plane containing the longitudinal XX' axis.
Figure 2B:
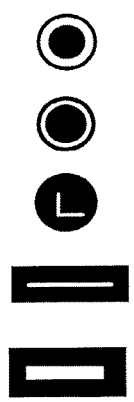
FIG. 2b is a diagrammatic view of different possible shapes of dies for implementation of the method according to the invention.

FIG. 2 shows an example embodiment of this invention.

The method according to the invention comprises a step of extruding a mix. An extrusion method compresses the mix and forces it to pass through a die. The die imposes a given shape on the profile of the extruded mix.

Profile of the extruded mix means the intersection with a plane perpendicular to the direction of extrusion of said mix.

The extrusion is carried out by means of an extruder 10 and allows an intimate mixing of the different elements forming the mix.

More particularly, extrusion makes thinner and more conducting membranes than those known according to the state of the art, for example at thickness ranging from 10 μm to 50 μm.

The extruder 10 comprises a sheath 11, extending along a longitudinal axis XX', inside which one or several, for example two, worm screws are placed. The extruder 10 may comprise a line (in other words along the longitudinal axis XX') composed of one or several heating zones 12, a mixing zone 13, and a pumping zone 14 terminated by a die 15 (it is understood that the heating zone 12, the mixing zone 13, and the pumping zone 14 are inside the sheath).

A heating zone 12 is intended to melt at least one of the elements forming the mix, by increasing the temperature. The extruder is also provided with first feed means 16, for example a gravimetric feeder, in one of the heating zones 12, for adding elements that will form the mix. The temperature is increased by heating means, the design of which is known by the one of ordinary skills and consequently these means are not described in this application.

A mixing zone 13 intimately mixes the elements forming the mix and can be contiguous with the heating zone 12. Mixing is then done by mixing means located on the worm screw(s). More particularly, the mixing means interrupt the thread of the worm screws, and may include vanes. The mixing means are known by the one of ordinary skills and therefore they are not described in this application. The mixing zone is also designed to induce a high shear rate and thus, as we will see in the remainder of the description, orient the chains of a support polymer. The mixing zone can also include second feed means 17.

The pumping zone 14, contiguous with the mixing zone 13, pushes the mix by pressure towards the die 15. The worm screw(s) comprise a thread in the pumping zone 14 to apply the pressure necessary to push the mix towards the die 15.

The die 15 can confer any shape whatsoever on the profile of the extruded mix. More particularly, the mix can be extruded in the form of a sheet, a hollow tube or a wedge-shaped profile.

The extrusion can be made by adding all or some of the elements forming the mix into the extruder at the first feed means 16. The elements are then heated in the heating zone 12, and are also pushed from the heating zone 12 towards the mixing zone 13 by the thread of the worm screw(s). Elements not added at the first feed means 16 are added at the second feed means 17.

The elements forming the mix comprise:
an alkali metal salt,
a dinitrile compound with formula N≡C—R—C≡N, in which R is a hydrocarbon group $C_nH_{2n}$, and n is equal to 1 or 2,
a hot melt support polymer, soluble in the dinitrile compound.

Alkali metal salt means a lithium salt, or a sodium salt, or a potassium salt.

A lithium salt may comprise at least one element chosen from among: lithium bis-trifluoromethanesulfonimide (LiTFSI), lithium bis(oxatlato)borate (LiBoB), $LiPF_6$, $LiClO_4$, $LiBF_4$, $LiAsF_6$, $LiCF_3SO_3$, $LiN(CF_3SO_2)_3$, $LiN(C_2F_5SO_2)$.

A lithium salt comprising $LiPF_6$ is generally very frequently used for fabrication of the electrolytic solution for lithium ion batteries, however it can advantageously be replaced by a lithium salt comprising LiTFSI that does not degrade in contact with water.

Besides, LiTFSI has thermal and chemical stability that improves safety when implemented in lithium ion batteries, and also improves their performances of said batteries. Thus, the alkali metal salt can advantageously contain LiTFSI.

A sodium salt may comprise at least one element chosen from among sodium bis-trifluoromethanesulfonimide (NaTFSI), sodium bis(oxatlato)borate (NaBoB), $NaPF_6$, $NaClO_4$, $NaBF_4$, $NaAsF_6$, $NaCF_3SO_3$, $NaN(CF_3SO_2)_3$, $NaN(C_2F_5SO_2)$.

A potassium salt may comprise at least one element chosen from among: Potassium bis-trifluoromethanesulfonimide (KTFSI), Potassium bis(oxatlato)borate (KBoB), $KPF_6$, $KClO_4$, $KBF_4$, $KAsF_6$, $KCF_3SO_3$, $KN(CF_3SO_2)_3$, $KN(C_2F_5SO_2)$, KSCN.

The dinitrile compound solubilises the alkali metal salt, and more particularly the lithium salt.

The alkali metal salt solubilised in the dinitrile compound forms the electrolytic solution.

The dinitrile compound is malononitrile or succinonitrile, when n=1 or n=2 respectively.

The melting temperature of the dinitrile compound used in the invention is more than 20° C. and advantageously replaces the electrolytic solution known in the state of the art.

It is particularly advantageous if n=2, in other words if the dinitrile compound is succinonitrile. Succinonitrile is a hyper-plastic, uninflammable and non-volatile organic compound with a melting temperature of 57° C.

Succinonitrile can also be used in an alkali metal ion battery at temperatures ranging from −20° C. to 250° C.

The alkali metal salt can indifferently be heat-solubilised in the dinitrile compound before extrusion or during extrusion.

The alkali metal salt solubilised in the dinitrile compound forms the electrolyte, also called the SNx electrolyte.

The alkali metal salt and the dinitrile compound, solubilised or not, can be added into the extruder at the first 16 or the second 17 feed means.

The concentration of alkali metal salt in the dinitrile compound can be between 0.5 mol/L and 5 mol/L.

For example, the alkali metal salt can be $LiPF_6$, diluted in succinonitrile to 1M %.

Advantageously and still as an example, the alkali metal salt can be LiTFSI, diluted in succinonitrile to 1 M %, and more particularly in succinonitrile also containing LiBoB at 0.2 M %.

The function of the support polymer is to form a matrix physically isolating the positive and negative electrodes of the alkali metal ion battery, while allowing the transfer of ion species from one electrode to another.

According to the invention, the support polymer is hot melt (and possible thermo ductile) and is soluble in the dinitrile compound.

It is understood throughout this description that the support polymer, in the sense of the invention, has a glass transition temperature Tg.

The support polymer is added into the heating zone 12 of the extruder 10 at the first feed means 16.

The support polymer can then advantageously be heated to a temperature T higher than its glass transition temperature Tg.

The support polymer, the dinitrile compound and the alkali metal salt are then brought into contact in the extruder, either in the heating zone 12, or in the mixing zone 13.

As soon as they are brought into contact either in the heating zone 12 or in the mixing zone 13, the support polymer and the dinitrile compound form a gel.

A gel means a three-dimensional lattice of solids diluted in a carrier fluid. Cohesion of the three-dimensional lattice may be achieved by chemical and/or physical bonds, and/or small crystals, and/or other bonds that remain intact in the carrier fluid.

As soon as it arrives in the mixing zone, the entire mix is homogenised and then pushed in the pumping zone 14, and then into the die 15 to be formed into the required shape of the separating membrane.

Advantageously, the mass ratio between the dinitrile compound and the support polymer is between 40/60 and 90/10, preferably between 65/35 and 75/25, and even more preferably of the order of 70/30.

The support polymer may include at least one of the elements chosen from among: polyvinylidene hexafluoropropylene copolyfluoride 21216 (PVDF-HFP 21216), polyvinylidene hexafluoropropylene copolyfluoride 21510 (PVDF-HFP 21510), poly(methyl methacrylate) (PMMA), poly(butyl methacrylate) (PBMA), polyethylene oxide (PEO), polyvinylpyrrolidone (PVP).

The above-mentioned elements have the required chemical, thermal and electrochemical stability for use in an alkali metal ion battery separation membrane.

The inventors also demonstrated that a support polymer comprising either the PEO or PVP polymer gelled practically instantaneously. Furthermore, after the gelling process, these two compounds are flexible, with slight swelling.

PEO, known for its ability to form complexes with a wide variety of lithium salts, has a relatively low ionic conductivity ($10^{-8}$ to $10^{-5}$ S/cm) at ambient temperature when it is used as a solid membrane.

However, as soon as it is combined with a dinitrile compound, and particularly succinonitrile, the ionic conductivity of the same membrane in gel form increases. For example, a separating membrane in gel form comprising PEO, succinonitrile and LiTFSI, in proportions 70:25:5, has an ionic conductivity of the order of $10^{-3}$ S/cm at ambient temperature.

Thus, use of the dinitrile compound and particularly succinonitrile, as plastifier, improves the ionic conductivity of the separating membranes that could not have been envisaged for use with a solid method.

Furthermore, if the dinitrile compound is succinonitrile, heating the support polymer to a temperature of between Tg and Tg+50° C., advantageously between Tg and Tg+25° C., can result in a separating membrane in gel form. Succinonitrile makes it possible to use extrusion temperatures close to the glass transition temperature of the support polymer.

A support polymer comprising one of the PVDF-HFP 21216 and PVDF-HFP 21510 polymers, after gelling with the dinitrile compound, has crystalline regions that participate in good mechanical strength of the separating membrane, and amorphous regions capable of trapping a large quantity of the mix of alkali metal salt solubilised in the dinitrile compound. The use of such polymers can give membranes with good mechanical strength and electrochemical performances compatible with their use in an alkali metal ion battery.

Concerning PMMA, the inventors have been able to demonstrate that PMMA can gel with a mass content of up to 70% of SNx electrolyte (more particularly the electrolyte comprising a succinonitrile-lithium salt mix). Furthermore, the separating membrane thus obtained has good mechanical strength and an ionic conductivity between 30° C. and 50° C. of the order of $10^{-4}$ to $10^{-3}$ S/cm for a thickness of 60 µm at ambient temperature.

Figure 3:
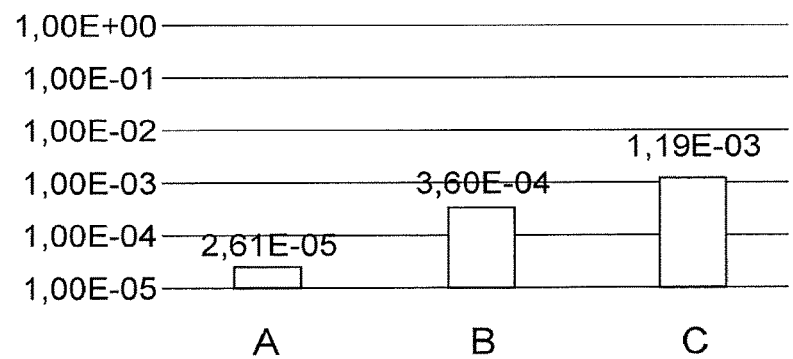
FIG. 3 is a graphic representation of ion conductivities in S/cm (on the vertical axis) of three membranes, A, B, and C containing PMMA, each gelled with succinonitrile, for different succinonitrile/PMMA mass ratios and different formation temperatures.

FIG. 3 represents the ionic conductivity of three membranes A, B and C, comprising PMMA, each gelled with succinonitrile. Table 1 shows succinonitrile/PMMA mass ratios, and the temperature at which membranes are formed by extrusion.

TABLE 1

| Membrane | Succinonitrile/PMMA mass ratio | Formation temperature (° C.) |
|---|---|---|
| A | 50/50 | 50 |
| B | 70/30 | 30 |
| C | 70/30 | 50 |

The conductivities of each of the gelled PMMA membranes are obtained by impedance spectroscopy.

The three membranes A, B, and C have acceptable ionic conductivities for use in an alkali metal ion battery, and more particularly in a lithium ion battery.

Figure 4:
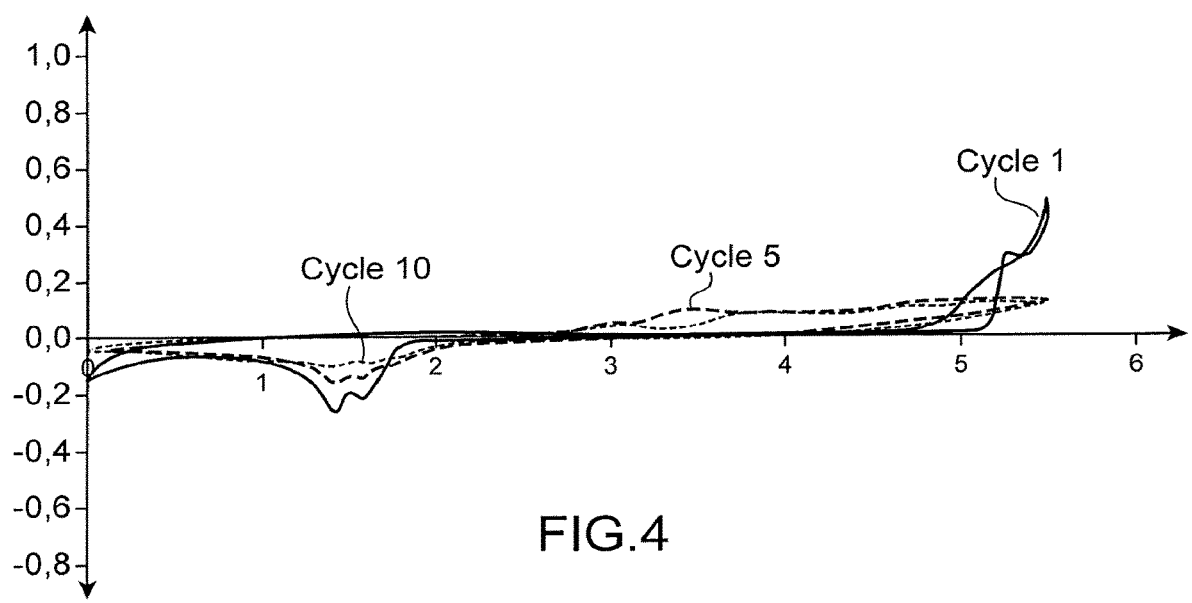
FIG. 4 represents a first cycle (Cycle 1), a fifth cycle (cycle 5) and a tenth cycle of a cyclic voltamperometry measurement (in mA on the vertical axis) made for voltages ranging from 0 V to 5 V (in Volts on the horizontal axis) on a gelled PMMA membrane.

FIG. 4 represents a cyclic voltamperometry measurement (in mA on the vertical axis) performed for voltages ranging from 0 V to 5 V (in Volts on the horizontal axis) for one cycle (cycle 1), five cycles (cycle 5) and ten cycles (cycle 10) on a gelled PMMA membrane respectively. The measurements thus presented in FIG. 4 show that the membrane remains stable for a voltages ranging from 0 V to 5 V.

The invention is not limited to a single support polymer, and a plurality of support polymers can be envisaged.

Note also that positive and negative electrodes can also be made using an extrusion method and can be laminated with the separating membrane at the exit from the extruder and thus form the electrochemical core of an alkali metal ion battery.

More particularly, the electrodes can also be formed in gel form.

Thus, the formation of either the positive electrode or the negative electrode may include extrusion of a mix comprising:
a support polymer,
an electrolyte containing an alkali metal salt solubilised in a dinitrile compound with formula N≡C—R—C≡N, in which R is a hydrocarbon group $C_nH_{2n}$, and n is equal to 1 or 2,
an active material capable of storing alkali ions (for example lithium ions) and releasing said alkali ions, the active material advantageously being chosen from: $LiFePO_4$, $LiNiMnCoO_2$ for the positive electrode, and the active material advantageously being $Li_4Ti_5O_{12}$ for the negative electrode.
an ion conductor, for example containing a mix of carbon black and carbon fibres.

The choice of the support polymer and the alkali salt can be the same as that chosen for the method of manufacturing the separating membrane described above.

The dinitrile compound can advantageously be succinonitrile.

The extrusion can also be made under conditions similar to the conditions for extrusion of the separating membrane according to the invention.

Thus, colamination of the positive electrode, the separating membrane and the negative electrode can be done directly at the exit from three extruders.

The invention claimed is:

1. A method of manufacturing a separating membrane in gel form, for an alkali metal ion battery, the method comprising extruding a mix comprising:
an alkali metal salt,
a dinitrile compound with formula N≡C—R—C≡N, in which R is a hydrocarbon group $C_nH_{2n}$, and n is equal to 1 or 2, and
a hot melt support polymer with a glass transition temperature Tg, soluble in the dinitrile compound.

2. The method of claim 1, in which the alkali metal salt is heat-solubilised in the dinitrile compound to form an electrolyte.

3. The method of claim 2, in which the extruding is performed by an extruder comprising a line composed of at least one heating zone, at least one mixing zone and a pumping zone terminated by a die.

4. The method of claim 3, in which the hot melt support polymer is added into the extruder at the at least one heating zone, where the hot melt support polymer is heated to a temperature T higher than the glass transition temperature Tg.

5. The method of claim 4, in which the alkali metal salt and the dinitrile compound are introduced into the extruder either in the at least one heating zone, or in the at least one mixing zone.

6. The method of claim 1, in which the alkali metal salt is a lithium salt.

7. The method of claim 1, in which the hot melt support polymer comprises at least one member selected from the group consisting of polyvinylidene hexafluoropropylene copolyfluoride, polyvinylidene hexafluoropropylene copolyfluoride, poly(methyl methacrylate), poly(butyl methacrylate), polyethylene oxide, and polyvinylpyrrolidone.

8. The method of claim 1, in which a mass ratio between the dinitrile compound and the hot melt support polymer is between 40/60 and 90/10.

9. The method of claim 1, in which a concentration of the alkali metal salt in the dinitrile compound is between 0.5 mol/L and 5 mol/L.

10. The method of claim 4, in which T is between Tg and Tg+50° C.

11. The method of claim 6, in which the lithium salt comprises at least one selected from the group consisting of lithium bis-trifluoromethanesulfonimide, lithium bis(oxatlato)borate, $LiPF_6$, $LiClO_4$, $LiBF_4$, $LiAsF_6$, $LiCF_3SO_3$, $LiN(CF_3SO_2)_3$, and $LiN(C_2F_5SO_2)$.

* * * * *